(12) United States Patent
Fasen (10) Patent No.: US 7,280,779 B2
(45) Date of Patent: Oct. 9, 2007

(54) IMAGE BANDING COMPENSATION METHOD

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 194 days.

(21) Appl. No.: 11/023,215

(22) Filed: Dec. 26, 2004

(65) Prior Publication Data

US 2006/0140655 A1 Jun. 29, 2006

(51) Int. Cl.
G03G 15/06 (2006.01)
(52) U.S. Cl. .................................... 399/55; 399/285
(58) Field of Classification Search ................ 399/55, 399/53, 285
See application file for complete search history.

(56) References Cited

U.S. PATENT DOCUMENTS

| | | | |
|---|---|---|---|
| 4,420,247 A * | 12/1983 | Suzuki et al. | |
| 4,851,960 A | 7/1989 | Nakamura et al. | |
| 5,365,318 A | 11/1994 | Hiraoka et al. | |
| 5,412,458 A * | 5/1995 | Kamaji et al. | 399/285 |
| 5,473,417 A * | 12/1995 | Hirano | 399/285 |
| 5,596,393 A | 1/1997 | Kobayashi et al. | |
| 5,815,768 A | 9/1998 | Clifton | |
| 5,970,280 A | 10/1999 | Suzuki et al. | |
| 6,101,357 A | 8/2000 | Wayman | |
| 6,266,508 B1 | 7/2001 | Nakagawa et al. | |
| 6,314,263 B1 * | 11/2001 | Yoshida et al. | |
| 6,622,000 B2 * | 9/2003 | Furukawa et al. | |
| 7,054,565 B2 * | 5/2006 | Shin | |
| 2001/0055503 A1 * | 12/2001 | Kin et al. | 399/285 |
| 2002/0009304 A1 | 1/2002 | Kin et al. | |
| 2003/0147658 A1 | 8/2003 | Shin et al. | |
| 2004/0042806 A1 | 3/2004 | Dougherty et al. | |
| 2004/0052540 A1 | 3/2004 | Kyung | |
| 2004/0067078 A1 | 4/2004 | An et al. | |
| 2004/0141766 A1 | 7/2004 | Toyama | |
| 2004/0190922 A1 * | 9/2004 | Nakagawa et al. | 399/55 |
| 2005/0248904 A1 * | 11/2005 | Kim et al. | |

FOREIGN PATENT DOCUMENTS

| | | |
|---|---|---|
| JP | 3045965 | 2/1991 |
| JP | 6083179 | 3/1994 |
| JP | 06289083 A * | 10/1994 |

\* cited by examiner

Primary Examiner—Susan Lee (57) ABSTRACT

An image forming method includes measuring an electrical potential on a surface of a developer roller and adjusting a time varying component of a voltage applied to the developer roller using a measurement of the electrical potential.

61 Claims, 4 Drawing Sheets

IMAGE BANDING COMPENSATION METHOD

BACKGROUND

A problem with the roller-based development techniques used in many color and mono-chrome printers is a variation in the toner density transferred to the Optical Photo Conductor (OPC) during rotation of the developer roller. This toner density variation may cause a variation in the resulting printed image that may be noticeable to a human observer and perceived as a defect in the printed image.

BRIEF DESCRIPTION OF THE DRAWINGS

Detailed description of embodiments of the present disclosure will be made with reference to the accompanying drawings.

DETAILED DESCRIPTION

The following is a detailed description for carrying out embodiments of the present disclosure. This description is not to be taken in a limiting sense, but is made merely for the purpose of illustrating the general principles of the example embodiments of the present disclosure.

Figure 1:
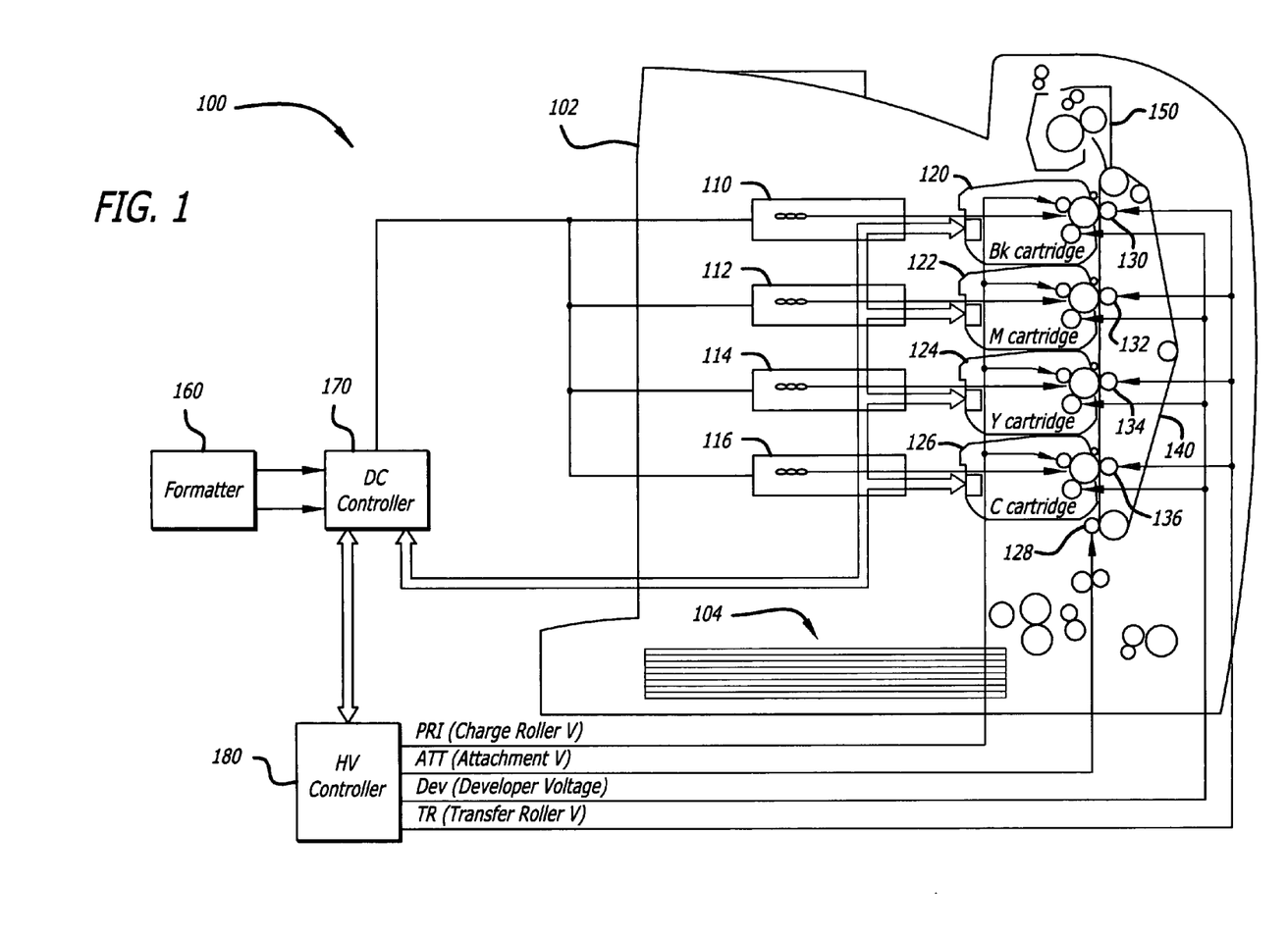
FIG. 1 is a diagram of an embodiment of an image formation system.

Referring to FIG. 1, an embodiment of an image formation system 100 includes a housing 102 containing a media tray 104, laser scanners 110, 112, 114 and 116, printer cartridges 120, 122, 124 and 126, an attaching roller 128, transfer rollers 130, 132, 134 and 136, an electrostatic transfer/transport belt (ETB) 140, and a fuser 150 configured as shown. In this example embodiment, the printer cartridges 120, 122, 124 and 126 are provided with Black, Magenta, Yellow and Cyan colored toner particles. It should be appreciated however that image formation systems incorporating the principles described herein can have any number of printer cartridges or other mechanisms for providing charged particles, as well as printer cartridges containing charged particles of different colors or redundant colors depending upon the particular application or system implementation. The embodiment image formation system 100 also includes a formatter 160, a direct current (DC) controller 170, and a high voltage (HV) controller 180 operatively interfaced with the components within the housing 102 as shown. It should be understood however that the formatter 160, DC controller 170 and/or HV controller 180 can also be located within the housing 102.

Figure 2:
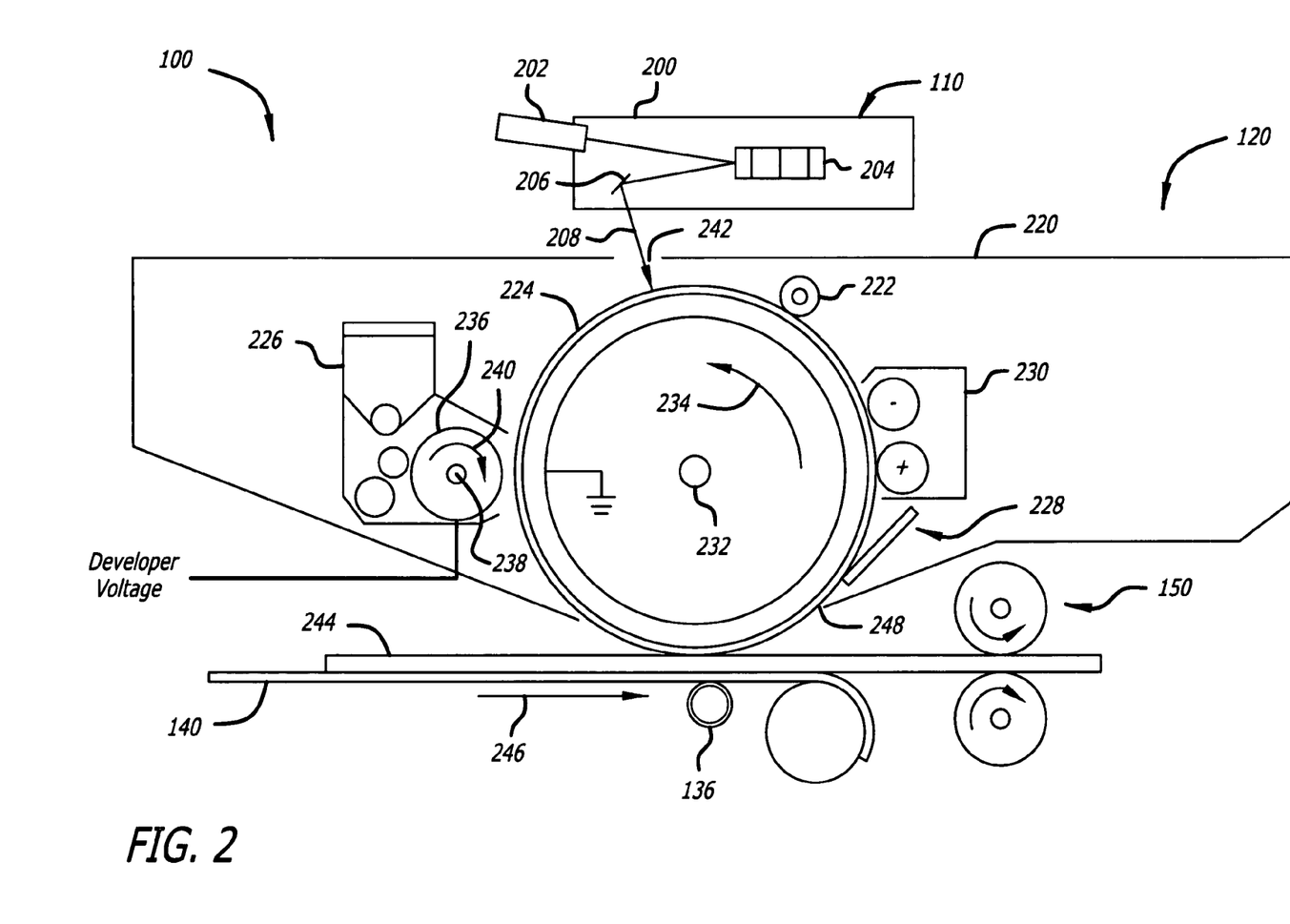
FIG. 2 is a diagram illustrating an embodiment of an Electro-Photographic (EP) process.

FIG. 2 shows portions of the embodiment image formation system 100 in greater detail. In this example embodiment, the laser scanner 110 includes a scanner housing 200, a laser diode 202 and mirror components 204 and 206 defining an optical path 208 exiting from the scanner housing 200 as shown. In this example embodiment, the mirror components 204 and 206 are a spinning mirror and a fixed mirror, respectively. In this example embodiment, the printer cartridge 120 includes a cartridge housing 220 containing a charge roller 222, a photoreceptor 224 (such as an Optical Photo Conductor (OPC)), a developer 226, a cleaning blade 228, and a photoreceptor cleaner 230 configured as shown. In this example embodiment, the photo-conducting surface of the photoreceptor 224 is cylindrical in shape, and in operation is rotated about the center of axis member 232 as indicated by arrow 234. In this example embodiment, the developer 226 includes a developer roller 236 facing the photo-conducting surface of the photoreceptor 224. In this example embodiment, the surface of the developer roller 236 is also cylindrical in shape, and in operation is rotated about the center of axis member 238 as indicated by arrow 240. Referring also to FIG. 1, the HV controller 180 provides a Charge Roller Voltage (to the charge roller 222), an Attachment Voltage (to the attachment roller 128), a Developer Voltage (to the developer roller 236), and a Transfer Roller Voltage (to the transfer roller 136) as shown. The function of the formatter 160 is to convert a print job (e.g., PCL files) to raw rasterized data, and to send motor commands to control modulation of the laser scanners 110, 112, 114 and 116.

In operation, the charge roller 222 imparts a charge to the photo-conducting surface of the photoreceptor 224. The laser scanner 110 generates a laser beam that enters the print cartridge 120 as shown through an aperture 242 in the cartridge housing 220. The laser beam is scanned across the photo-conducting surface selectively discharging the photo-conducting surface according to image information provided by the formatter 160. In the next step in this example Electro-Photographic process, toner is applied to the surface of the developer roller 236 for selective transfer to the photo-conducting surface of the photoreceptor 224 to create a latent image on the photo-conducting surface. As an article of media 244 (e.g., paper) is advanced by the ETB 140 along a feed direction indicated by arrow 246, the electric field provided by transfer roller 136 transfers the toner (or other charged particles) from the photo-conducting surface of the photoreceptor 224 to the article of media 244, through an aperture 248 in the cartridge housing 220. After the development process is over, the fuser 150 (e.g., a heat roller and a pressure roller) fixes the toner in place on the article of media 244. The cleaning blade 228 cleans the photo-conducting surface of the photoreceptor 224 before a new cycle is started. In this example embodiment, the photoreceptor cleaner 230 includes an erase lamp as shown.

According to the present disclosure, it has been observed that variation in the electrical potential on the surface of the developer roller 236 can be at least a contributing cause to density variation in the toner included in the latent image. Because the colors or hues change due to the density variation, this effect is called Hue Banding. As a consequence of the relatively long wavelength that can occur for this density variation, the effect on the printed image can be seen from a large distance and can be one of the first image defects noticed on a print sample. In some embodiments of image formation systems the banding resulting in an image may have a period equal to the circumference of the developer roller 236. Moreover, it has been observed that variation in the resistance of the developer roller 236 causes a time varying potential at a stationary probe near or in contact with the surface of the developer roller 236. The developer surface potential can be determined for a non-contact probe if, in an embodiment, a charge-amplifier is used to process the signal from such a probe. Another possible cause or least contributing source of image banding can come from variation in the spacing between the surface of the developer roller 236 and the photo-conducting surface of the photoreceptor 224. The subject matter of the present disclosure also addresses reducing banding resulting from variation in the spacing between the surface of the developer roller 236 and the photo-conducting surface of the photoreceptor 224, up to the limits of the voltage available for the developer roller 236 before undesired breakdown occurs. If the developer-OPC spacing becomes too large, the developer voltage to permit uniform transfer will be larger than the limit of voltage available for the developer roller and variation in the toner density will occur.

Figure 3:
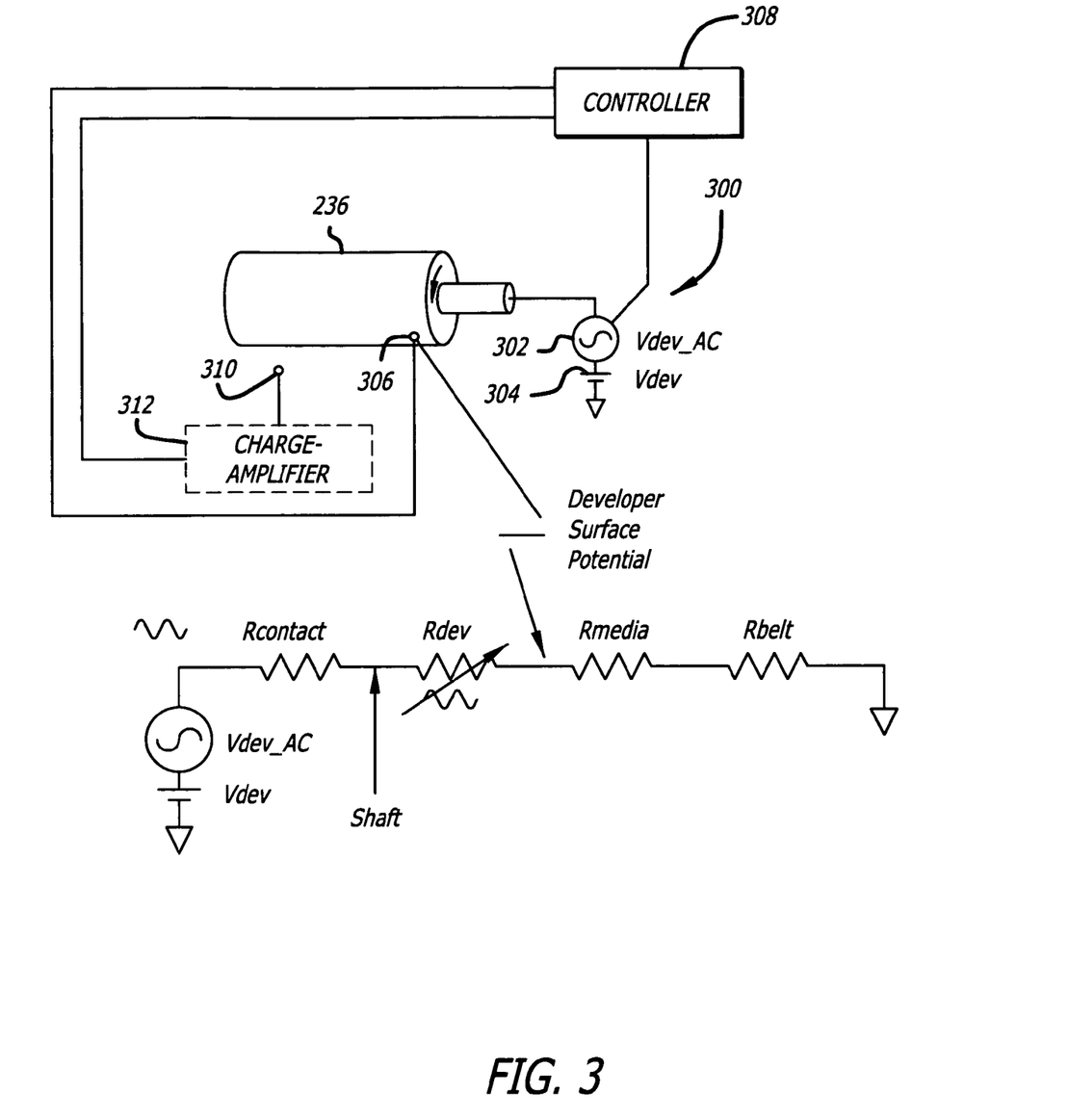
FIG. 3 illustrates an embodiment of an image banding compensation apparatus that is configured for modulating a developer roller voltage with an out-of-phase AC signal to cancel electrical potential variation at the surface of the developer roller.

Various embodiments described herein pertain to substantially canceling or at least reducing toner density variation which, sometimes, is observable in printed images as hue banding. Referring to FIG. 3, in an example embodiment, a compensation apparatus, such as image banding compensation apparatus 300, includes a time varying power supply, such as alternating current (AC) power supply 302, that is electrically connected with a direct current (DC) power supply 304 for the developer roller 236, a probe 306 configured for measuring an electrical potential at the surface of the developer roller 236, and a controller 308 configured to control the AC power supply 302 depending upon the electrical potential. In FIG. 3, a non-contact probe 310 and a charge-amplifier 312 (in dashed lines) are also shown. The circuit equivalent, also included in FIG. 3, shows elements Rcontact, Rmedia and Rbelt which represent the contact resistance between the AC power supply 302 and the shaft of the developer roller 236, the resistance of a piece of media (e.g., paper), and the resistance of the ETB 140, respectively. The circuit equivalent also illustrates that the resistance Rdev of the developer roller 236 is variable, and how, according to an example embodiment, the AC power supply 302 is used for modulating a developer roller voltage with an out-of-phase AC signal to compensate for, or at least reduce the effects of, the electrical potential variation at the surface of the developer roller 236. By modulating the developer roller voltage with an out-of-phase AC signal, the electrical potential variation at the surface of the developer roller 236 can be at least reduced, or possibly substantially canceled in some embodiments. By providing a steady potential on the surface of the developer roller 236, the resulting toner density is more consistent.

In an example embodiment, an apparatus includes a controller for a power supply to generate a voltage for a developer, the controller configured to modulate the voltage to reduce image banding caused by variations in a surface voltage of the developer.

In an example embodiment, an image banding compensation apparatus includes a controller for a power supply that generates a developer voltage for a developer, the controller being configured to adjust, such as modulate in an embodiment, the developer voltage to at least reduce or substantially correct for image banding caused by variations in a surface voltage of the developer.

In an example embodiment, an image banding compensation apparatus includes a mechanism for measuring an electrical potential at a surface of a developer, and a mechanism for adjusting an alternating current (AC) component of a developer voltage applied to the developer to compensate for image banding—caused by variations in the electrical potential and/or variations in the developer-OPC spacing.

The controller (for the AC power supply 302) can be implemented, by way of example, as part of the DC controller 170 (FIG. 1). In an example embodiment, the controller is configured to adjust, through modulation in this embodiment, a developer roller voltage with an AC signal that is out of phase with respect to the electrical potential measured to at least reduce or substantially cancel the electrical potential variation at the surface of the developer roller 236. In an example embodiment, the controller is configured to generate a developer bias voltage that has a magnitude and a phase that at least reduce or substantially cancel harmonic content in the electrical potential. In an example embodiment, the controller is configured to generate a developer bias voltage that has a magnitude and a phase that at least reduce or substantially cancel a once-around variation (Tp) in the electrical potential.

In an example embodiment, an image forming method includes measuring an electrical potential on a surface of a developer roller and adjusting a time varying component of a voltage applied to the developer roller using a measurement of the electrical potential.

In an example embodiment, an image forming method includes measuring an electrical potential at a surface of a developer in an image forming device, and controlling an alternating current (AC) component of a developer voltage applied to the developer to at least reduce or substantially correct for image banding caused by variations in the electrical potential. In an example embodiment, the developer voltage is modulated to be out of phase with respect to the electrical potential measured, for example, on the surface of developer roller 236. In an example embodiment, the developer voltage is adjusted to compensate for a repeatable harmonic component of the electrical potential measured, for example, on the surface of developer roller 236.

Figure 4:
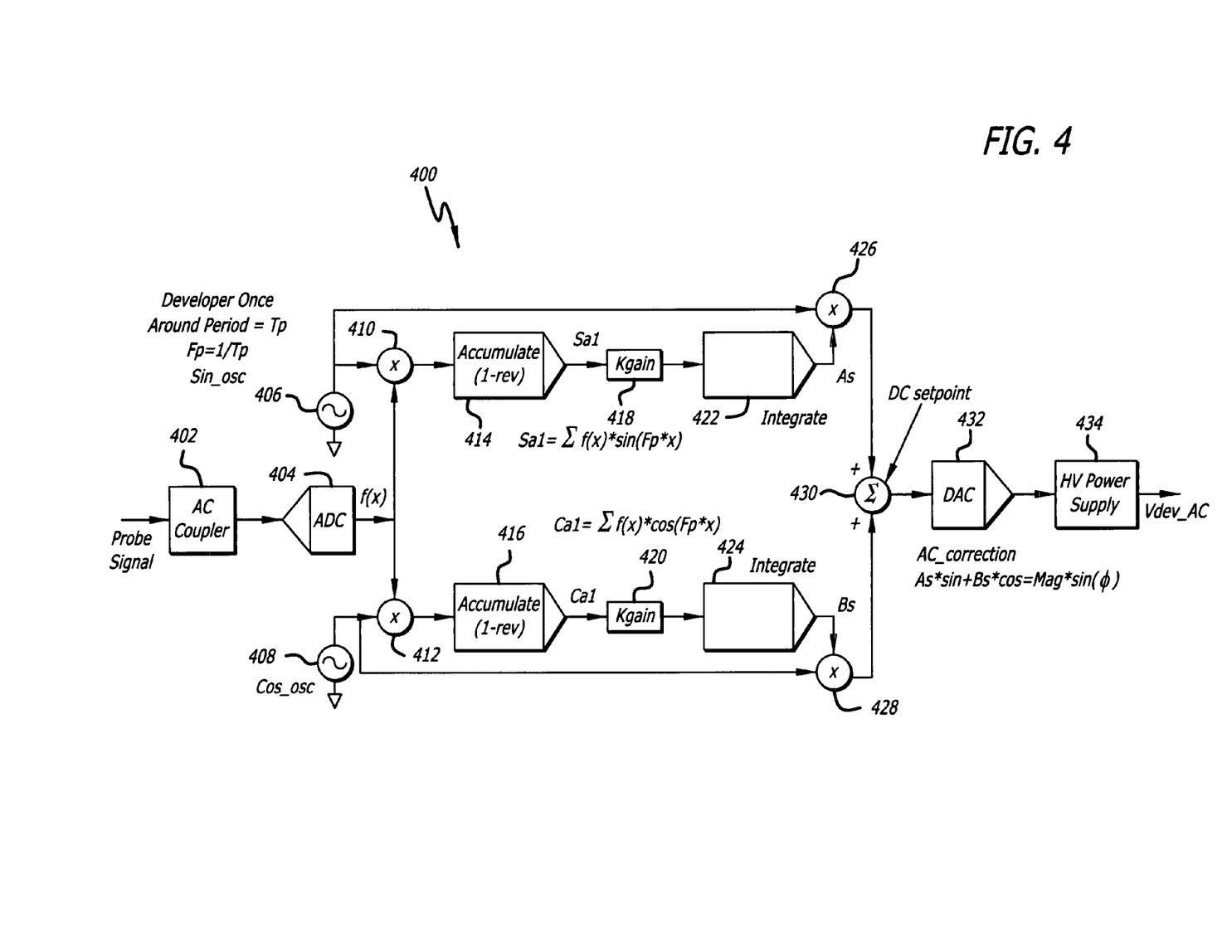
FIG. 4 illustrates an embodiment of an digital implementation of an image banding compensation apparatus.

In various example embodiments, the developer voltage is controlled using a digital processing technique. Referring to FIG. 4, in an example embodiment, a digital controller 400 includes an AC coupler 402, an Analog-to-Digital Converter (ADC) 404, digital oscillators 406 and 408, multipliers 410 and 412, accumulators 414 and 416, gain elements 418 and 420, integrators 422 and 424, multipliers 426 and 428, summation element 430, and Digital-to-Analog Converter (DAC) 432 configured as shown. The AC coupler 402 (e.g., a capacitor) attenuates a high DC voltage measured by the probe 306 at the surface of the developer. The ADC 404 converts the electrical potential measured by the probe 306 into a digitized probe signal. The digital oscillators 406 and 408 are configured to generate oscillator signals, in this example embodiment, Sine and Cosine oscillator signals. The Sine and Cosine oscillators provide for stability and predictable start-up characteristics in terms of phase and amplitude. The accumulators 414 and 416 are configured to sum products of the oscillator signals and the digitized probe signal (output by the multipliers 410 and 412, respectively) to create Fourier sums as shown. The integrators 422 and 424 monitor the Fourier sums and adjust magnitudes of the digital oscillators 406 and 408 to create an AC correction signal. The gain elements 418 and 420 facilitate adjustment of a rate of probe signal nulling. The correction gain (Kgain) can be set to zero when the Probe_Signal is unavailable or invalid, for example, during the actual printing of a page. In an example embodiment, the integrators 422 and 424 can be fixed to output the oscillator signal. This allows a correction to remain in place, even though the option to perform active nulling may not be available in this embodiment at all times. The summation element 430 receives and adds together the outputs of the multipliers 426 and 428 and a DC setpoint to generate the AC correction signal. The DAC 432 converts the AC correction signal into an analog signal that is provided to the AC power supply (e.g., an HV power supply 434 in this embodiment).

In an example embodiment, the DC controller 170 (FIG. 1) is provided with a digital signal processor (DSP), and elements of the digital controller 400 are implemented in the DSP. In such an example embodiment, the AC correction value can be provided directly to a DAC of the HV Controller 180. Thus, according to various embodiments, existing ADC, DAC and/or μComputer elements can be utilized to implement the image banding compensation techniques described herein.

In operation, the developer roller probe voltage is Analog-to-Digital converted with a sampling period of Ts. The output from each of the digital oscillators 406 and 408 is used to detect the Fourier component of the probe signal at the once-around rate of the developer roller 236. The accumulators 414 and 416 sum the product of each of the oscillator signals and the digitized probe signal to create the Fourier sums (Sa1 and Ca1).

To drive these Fourier components to zero, the integrators 422 and 424 monitor the Fourier components and adjust the magnitude of the Sine and Cosine oscillator signals that are summed to create the AC correction signal. By adjusting the relative magnitude of the Sine and Cosine oscillator signals, the resulting AC correction signal can have any suitable magnitude or phase relative to the probe signal to account for delays in the probe signal relative to the point of developer contact with the OPC. Thus, it should be appreciated that the term "out of phase" is not limited to an AC correction that differs in phase by 180 degrees from the phase of the electrical potential measured. Other phase shifts may be used to drive the integrator inputs to zero.

The gain of the AC correction loop (Kgain) can be set to null the detected probe signal at a rate much slower than the period of the developer roller itself (Tp). For example, Kgain can be set to zero to disable the nulling action when the probe signal is expected to be inaccurate. In this case, the oscillators will continue to generate the AC correction signal with the same magnitude and phase as when the loop was active (Kgain>0). In an example embodiment, the Fourier sums (Sa1, Ca1) are effectively narrow-band filtered by the accumulator acting as a Fourier summer.

The AC correction signal is combined with the DC setpoint and converted to an analog signal that is fed to the High Voltage power supply to generate the developer voltage. In an example embodiment, the HV power supply 434 generates a developer roller bias potential that is proportional to a low voltage input signal supplied by the DAC 432.

Once the AC signal on the developer bias voltage has been adjusted to the correct magnitude and phase to substantially cancel the once-around variation (Tp) in the developer roller, the probe signal will have substantially no signal at this Tp period, the Fourier components Sa1 and Ca1 will be nulled (zero value) and no changes to the As or Bs values will be made. In an example embodiment, the integrators 422 and 424 have their inputs to go to zero; and the magnitude and phase are adjusted to drive the input to the integrators to zero. The control loop is then steady state and the developer non-uniformity is at least reduced or substantially canceled.

Alienation is deactivation of components in the EP process when they are not used. For example, the developer roller in disengaged from the gear drive and the OPC when the engine is shut down or on a color cartridge when mono-only pages are printed. When the cartridge is needed again, the developer roller is re-engaged (De-alienated) but with an arbitrary phase relationship to the previous engagement. After an Alienation-Dealienation cycle, the orientation of the developer relative to the phase of the digital oscillators, ideally, is controlled or available to digital controller 400. If this is not the case, a lengthier adaptation time can be employed so that the cancellation phase relationship can be re-learned.

In the example embodiment described above, the digital controller 400 substantially corrects once-around frequency or first harmonic. Once around nulling provides for a very high rejection of that frequency. In an alterative embodiment, a single digital oscillator can be used instead of two to generate the Sine and Cosine oscillator signals.

In alternative embodiments, additional "banks" of circuitry such as shown in FIG. 4 can be employed in a similar fashion to compensate for other repeatable harmonic components of the developer roller 236 (e.g., twice around, four times around, etc.)

In an example embodiment, an image forming system includes a photo-conducting surface, a mechanism for selectively charging the photo-conducting surface, a developer including a surface for imparting charged particles to the photo-conducting surface, a mechanism for transferring the charged particles from the photo-conducting surface to an article of media, a mechanism for repositioning the photo-conducting surface in relation to the developer and the article of media, a mechanism for measuring an electrical potential at the surface of the developer, and a mechanism for adjusting an alternating current (AC) component of a developer voltage applied to the developer to correct for image banding caused by variations in the electrical potential. In an example embodiment, the photo-conducting surface, the developer, and the mechanism for measuring are contained within a modular component of the image forming system (such as a printer cartridge).

By at least reducing or substantially canceling the density variation electronically, the print quality and/or roller manufacturing yield can be increased. Moreover, the cancellation techniques described herein make it easier to accommodate developer rollers from different sub-vendors or different lots from a particular sub-vendor (which can vary significantly), and potentially lessen the benefit that may achieved in using stringent mechanical and/or process control regimes.

Although embodiments of the present disclosure have been described in terms of the example embodiments above, numerous modifications and/or additions to the above-described embodiments would be readily apparent to one skilled in the art. It is intended that the scope of the claimed subject matter extends to all such modifications and/or additions.

I claim:

1. An image forming method comprising:
   measuring an electrical potential on a surface of a developer roller; and
   adjusting a time varying component of a voltage applied to the developer roller using a measurement of the electrical potential;
   wherein the time varying component is adjusted to reduce a variation in the electrical potential.

2. The image forming method of claim 1, wherein the time varying component is an alternating current (AC) voltage.

3. The image forming method of claim 1, wherein the time varying component is adjusted to reduce image banding caused by a variation in the electrical potential.

4. The image forming method of claim 1, wherein the time varying component is adjusted to reduce a harmonic component of the electrical potential.

5. The image forming method of claim 1, wherein the time varying component is modulated to be out of phase with respect to the electrical potential.

6. The image forming method of claim 1, wherein the time varying component is controlled using a digital processing technique.

7. The image forming method of claim 1, wherein the time varying component is controlled using one or more digital oscillators.

8. The image forming method of claim 1, wherein the time varying component is adjusted to reduce a harmonic component of the electrical potential at a once around frequency of the electrical potential.

9. The image forming method of claim 1, wherein the time varying component is adjusted to reduce a higher order harmonic component of the electrical potential.

10. An apparatus comprising:
   an alternating current (AC) power supply electrically connected with a direct current (DC) power supply for a developer roller;
   a probe configured for measuring an electrical potential at a surface of the developer roller; and
   a controller configured to control the AC power supply using the electrical potential measured.

11. The apparatus of claim 10, wherein the probe is in contact with the surface.

12. The apparatus of claim 10, wherein the probe is not in contact with the surface.

13. The apparatus of claim 10, wherein the controller is configured to modulate a developer roller voltage with an AC signal that is out of phase with respect to the electrical potential measured.

14. The apparatus of claim 10, wherein the controller is configured to modulate a developer roller voltage with an AC signal to reduce electrical potential variation at the surface of the developer roller.

15. The apparatus of claim 10, wherein the controller is configured to generate a developer voltage that has a magnitude and a phase to reduce harmonic content in the electrical potential.

16. The apparatus of claim 10, wherein the controller is configured to generate a developer voltage that has a magnitude and a phase to reduce a once-around variation (Tp) in the electrical potential.

17. The apparatus of claim 10, wherein the controller uses one or more digital oscillators to generate an AC developer voltage.

18. The apparatus of claim 10, wherein the controller is configured to detect Fourier components of a signal measured by the probe at a once-around rate of the developer roller.

19. The apparatus of claim 10, wherein the controller includes
   one or more digital oscillators configured to generate oscillator signals,
   accumulators configured to sum products of the oscillator signals and a digitized probe signal to create Fourier sums, and
   integrators that monitor the Fourier sums and adjust magnitudes of the digital oscillators to create an AC correction signal.

20. The apparatus of claim 19, wherein the controller includes gain elements for adjusting a rate of probe signal nulling.

21. The apparatus of claim 19, wherein the controller includes an Analog-to-Digital Converter (ADC) for converting the electrical potential measured into the digitized probe signal.

22. The apparatus of claim 19, wherein the controller includes a Digital-to-Analog Converter (DAC) for converting the AC correction signal into an analog signal that is provided to the AC power supply.

23. An apparatus comprising:
   a controller for a power supply to generate a voltage for a developer, the controller configured to modulate the voltage to reduce image banding caused by variations in a surface voltage of the developer;
   wherein the developer is a roller, and the controller is configured to generate a developer bias voltage that has a magnitude and a phase to reduce a once-around variation (Tp) in the surface voltage.

24. The apparatus of claim 23, wherein the controller is configured to modulate the voltage with an alternating current (AC) signal that is out of phase with respect to the surface voltage.

25. The apparatus of claim 24, wherein the controller uses one or more digital oscillators to generate an AC developer voltage.

26. The apparatus of claim 23, wherein the developer is a roller, and the controller is configured to generate a developer bias voltage that has a magnitude and a phase to reduce harmonic content in the surface voltage.

27. The apparatus of claim 23, wherein the controller is configured to detect Fourier components of a signal measured by a probe at a once-around rate of the roller.

28. The apparatus of claim 23, wherein the controller includes
   one or more digital oscillators configured to generate oscillator signals,
   accumulators configured to sum products of the oscillator signals and a digitized surface voltage signal to create Fourier sums, and
   integrators that monitor the Fourier sums and adjust magnitudes of the digital oscillators to create an AC correction signal.

29. The apparatus of claim 28, wherein the controller includes gain elements for adjusting a rate of surface voltage signal nulling.

30. The apparatus of claim 28, wherein the controller includes an Analog-to-digital Converter (ADC) for converting the surface voltage into the digitized surface voltage signal.

31. The apparatus of claim 28, wherein the controller includes a Digital-to-Analog Converter (DAC) for converting the AC correction signal into an analog signal that is provided to the power supply.

32. An image banding compensation apparatus comprising:
   means for measuring an electrical potential at a surface of a developer; and
   means for adjusting an alternating current (AC) component of a voltage applied to the developer;
   wherein the AC component is adjusted to be out of phase with respect to the electrical potential measured.

33. The image banding compensation apparatus of claim 32, wherein the means for measuring includes a probe positioned adjacent to the surface.

34. The image banding compensation apparatus of claim 32, wherein the developer is a roller, and the AC component is adjusted to cancel harmonic content in the electrical potential.

35. The image banding compensation apparatus of claim 32, wherein the developer is a roller, and the AC component is adjusted to cancel a once-around variation (Tp) in the electrical potential.

36. The image banding compensation apparatus of claim 32, wherein the AC component is adjusted using a digital processing technique.

37. The image banding compensation apparatus of claim 32, wherein the means for adjusting includes one or more digital oscillators.

38. The image banding compensation apparatus of claim 37, wherein the means for adjusting includes
- accumulators configured to sum products of oscillator signals generated by the digital oscillators and a digitized electrical potential signal to create Fourier sums, and
- integrators that monitor the Fourier sums and adjust magnitudes of the digital oscillators to create an AC correction signal.

39. The image banding compensation apparatus of claim 38, wherein the means for adjusting includes gain elements for adjusting a rate of electrical potential signal nulling.

40. The image banding compensation apparatus of claim 38, wherein the means for adjusting includes an Analog-to-Digital Converter (ADC) for converting the electrical potential into the digitized electrical potential signal.

41. The image banding compensation apparatus of claim 38, wherein the means for adjusting includes a Digital-to-Analog Converter (DAC) for converting the AC correction signal into the AC component of a developer voltage.

42. An image forming system comprising:
- a photo-conducting surface;
- a mechanism for selectively charging the photo-conducting surface;
- a developer including a surface for imparting charged particles to the photo-conducting surface;
- a mechanism for transferring the charged particles from the photo-conducting surface to an article of media;
- a mechanism for repositioning the photo-conducting surface in relation to the developer and the article of media;
- a mechanism for measuring an electrical potential at the surface of the developer; and
- a mechanism for adjusting an alternating current (AC) component of a developer voltage applied to the developer to correct for image banding caused by variations in the electrical potential.

43. The image forming system of claim 42, wherein the photo-conducting surface, the developer, and the mechanism for measuring are contained within a modular component of the image forming system.

44. The image forming system of claim 43, wherein the modular component is a printer cartridge.

45. The image forming system of claim 42, wherein the mechanism for adjusting includes a digital signal processor.

46. The image forming system of claim 42, wherein the photo-conducting surface is cylindrical in shape.

47. The image forming system of claim 42, wherein the mechanism for selectively charging includes a laser scanner.

48. The image forming system of claim 42, wherein the surface of the developer is cylindrical in shape and configured to rotate in relation to the photo-conducting surface.

49. The image forming system of claim 48, wherein the AC component is adjusted to reduce harmonic content in the electrical potential.

50. The image forming system of claim 48, wherein the AC component is adjusted to reduce a once-around variation (Tp) in the electrical potential.

51. The image forming system of claim 42, wherein the mechanism for transferring includes a transfer roller.

52. The image forming system of claim 42, wherein the mechanism for repositioning includes an electrostatic transfer/transport belt (ETB).

53. The image forming system of claim 42, wherein the mechanism for measuring includes a probe positioned adjacent to the surface.

54. The image forming system of claim 42, wherein the AC component is adjusted to be out of phase with respect to the electrical potential measured.

55. The image forming system of claim 42, wherein the AC component is adjusted using a digital processing technique.

56. The image forming system of claim 42, wherein the mechanism for adjusting includes a controller.

57. The image forming system of claim 42, wherein the mechanism for adjusting includes one or more digital oscillators.

58. The image forming system of claim 57, wherein the mechanism for adjusting includes
- accumulators configured to sum products of oscillator signals generated by the digital oscillators and a digitized electrical potential signal to create Fourier sums, and
- integrators that monitor the Fourier sums and adjust magnitudes of the digital oscillators to create an AC correction signal.

59. The image forming system of claim 58, wherein the mechanism for adjusting includes gain elements for adjusting a rate of electrical potential signal nulling.

60. The image forming system of claim 58, wherein the mechanism for adjusting includes an Analog-to-Digital Converter (ADC) for converting the electrical potential into the digitized electrical potential signal.

61. The image forming system of claim 58, wherein the mechanism for adjusting includes a Digital-to-Analog Converter (DAC) for converting the AC correction signal into the AC component of a developer voltage.

* * * * *

UNITED STATES PATENT AND TRADEMARK OFFICE
CERTIFICATE OF CORRECTION

PATENT NO. : 7,280,779 B2 Page 1 of 1
APPLICATION NO. : 11/023215
DATED : October 9, 2007
INVENTOR(S) : Donald J. Fasen It is certified that error appears in the above-identified patent and that said Letters Patent is hereby corrected as shown below:

In column 8, line 41, in Claim 30, delete "digital" and insert -- Digital --, therefor.

Signed and Sealed this

Twelfth Day of August, 2008

JON W. DUDAS
*Director of the United States Patent and Trademark Office*